(12) United States Patent
Matsumoto

(10) Patent No.: US 10,031,503 B2
(45) Date of Patent: Jul. 24, 2018

(54) ENERGY MANAGEMENT DEVICE, ENERGY MANAGEMENT METHOD, AND ENERGY MANAGEMENT SYSTEM

(71) Applicant: KYOCERA Corporation, Kyoto-shi, Kyoto (JP)

(72) Inventor: Hiroyuki Matsumoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 143 days.

(21) Appl. No.: 14/915,149

(22) PCT Filed: Aug. 29, 2014

(86) PCT No.: PCT/JP2014/004449
§ 371 (c)(1),
(2) Date: Feb. 26, 2016

(87) PCT Pub. No.: WO2015/029448
PCT Pub. Date: Mar. 5, 2015

(65) Prior Publication Data
US 2016/0202682 A1   Jul. 14, 2016

(30) Foreign Application Priority Data

Aug. 29, 2013  (JP) ................. 2013-178032
Aug. 29, 2013  (JP) ................. 2013-178069
Sep. 5, 2013   (JP) ................. 2013-184363

(51) Int. Cl.
*G05D 3/12*   (2006.01)
*G05D 5/00*   (2006.01)
(Continued)

(52) U.S. Cl.
CPC .......... *G05B 19/048* (2013.01); *G06Q 10/04* (2013.01); *G06Q 50/06* (2013.01); *H02J 3/00* (2013.01);
(Continued)

(58) Field of Classification Search
CPC .......... G05B 19/048; G05B 2219/2639; G06Q 10/04; G06Q 50/06; Y04S 20/222;
(Continued)

(56) References Cited

U.S. PATENT DOCUMENTS 6,665,590 B2    12/2003  Harada et al.
2002/0019802 A1 *  2/2002  Malme ................. G06Q 10/06
                                                        705/37
(Continued)

FOREIGN PATENT DOCUMENTS

JP    2001-327081 A    11/2001
JP    2002-027669 A     1/2002
(Continued)

OTHER PUBLICATIONS

International Search Report and Written Opinion of the International Searching Authority issued by the Japanese Patent Office for International Application No. PCT/JP2014/004449.
(Continued)

*Primary Examiner* — Ziaul Karim
(74) *Attorney, Agent, or Firm* — Procopio Cory Hargreaves and Savitch LLP

(57) ABSTRACT

The present disclosure allows estimation of a future power demand with high precision based on power consumptions in the past. An energy management device 10 according to the present disclosure includes a communicator 111 configured to acquire information regarding a power consumption and a controller 112 configured to calculate a targeted range of a future estimated power demand to be notified to a power company based on the information regarding the power consumption. The controller 112 calculates, for each predetermined time limit, the targeted range based on statistics of the power consumptions acquired over a predetermined number of days.

17 Claims, 12 Drawing Sheets

(51) Int. Cl.
*G05D 9/00* (2006.01)
*G05D 11/00* (2006.01)
*G05D 17/00* (2006.01)
*G05B 19/048* (2006.01)
*G06Q 50/06* (2012.01)
*H02J 3/00* (2006.01)
*H02J 7/35* (2006.01)
*G06Q 10/04* (2012.01)
*H02J 3/14* (2006.01)

(52) U.S. Cl.
CPC .............. *H02J 3/14* (2013.01); *H02J 7/35* (2013.01); *G05B 2219/2639* (2013.01); *H02J 2003/003* (2013.01); *H02J 2003/146* (2013.01); *Y02B 70/3225* (2013.01); *Y04S 20/222* (2013.01); *Y04S 20/224* (2013.01)

(58) Field of Classification Search
CPC .............. Y04S 20/224; Y02B 70/3225; H02J 2003/003; H02J 2003/146; H02J 3/14; H02J 7/35; H02J 3/00
USPC .................................................. 700/291–300
See application file for complete search history.

(56) References Cited

U.S. PATENT DOCUMENTS

| | | | |
|---|---|---|---|
| 2003/0083787 A1 | 5/2003 | Harada et al. | |
| 2003/0083788 A1* | 5/2003 | Harada | G05B 15/02 700/291 |
| 2004/0088240 A1* | 5/2004 | Komaki | G06Q 10/06 705/36 R |
| 2012/0010758 A1* | 1/2012 | Francino | G05B 17/02 700/291 |
| 2013/0123995 A1* | 5/2013 | Saito | G06Q 10/04 700/291 |
| 2013/0245847 A1* | 9/2013 | Steven | G06Q 50/06 700/291 |
| 2013/0346139 A1* | 12/2013 | Steven | G06Q 10/00 705/7.24 |
| 2015/0127179 A1* | 5/2015 | Binding | H02J 3/28 700/291 |
| 2015/0188482 A1* | 7/2015 | Berkowitz | H02J 3/383 320/101 |

FOREIGN PATENT DOCUMENTS

| | | |
|---|---|---|
| JP | 2003-143757 A | 5/2003 |
| JP | 2007-020314 A | 1/2007 |
| WO | 2012/014731 A1 | 2/2012 |
| WO | 2013/093794 A2 | 6/2013 |

OTHER PUBLICATIONS

Extended European Search Report dated Mar. 9, 2017, issued by the European Patent Office in counterpart European Patent Application No. 14 83 9859.7.

* cited by examiner

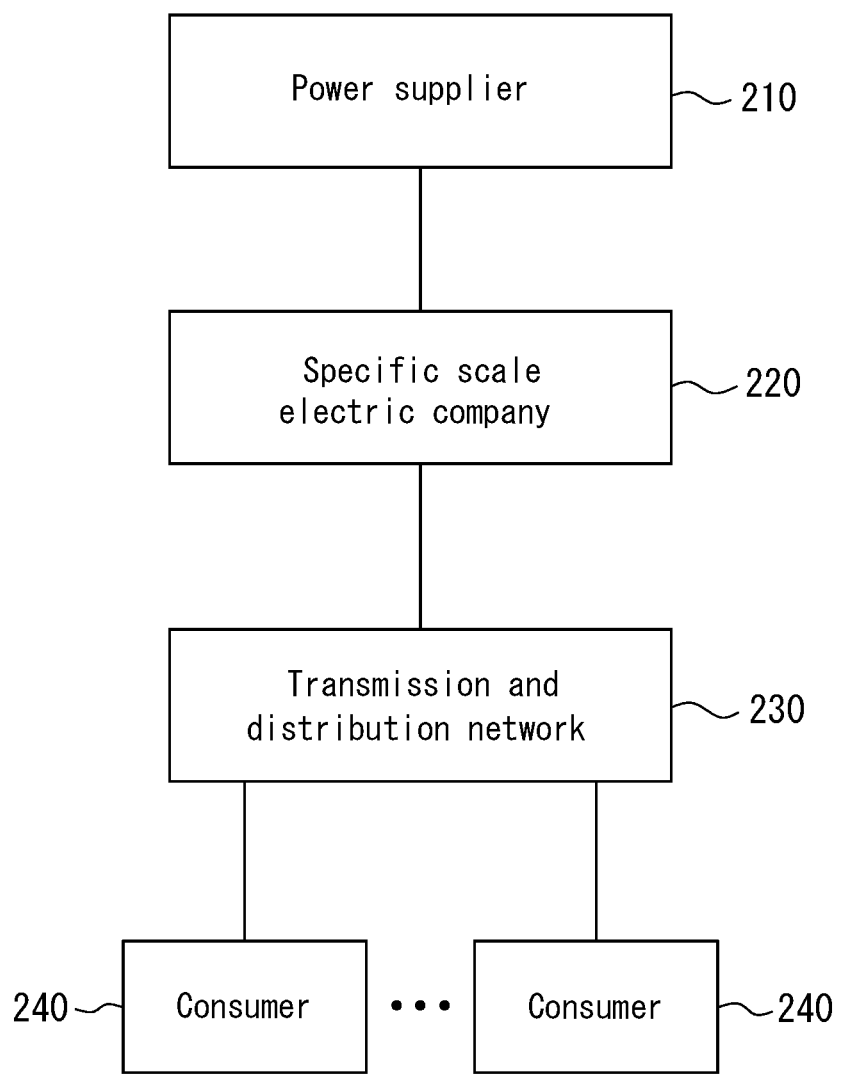

ENERGY MANAGEMENT DEVICE, ENERGY MANAGEMENT METHOD, AND ENERGY MANAGEMENT SYSTEM

CROSS-REFERENCE TO RELATED APPLICATION

This application is a 371 National Stage of International Patent Application No. PCT/JP2014/004449 filed on Aug. 29, 2014, which claims priority to and the benefit of Japanese Patent Application No. 2013-178032 filed on Aug. 29, 2013, Japanese Patent Application No. 2013-178069 filed on Aug. 29, 2013, and Japanese Patent Application No. 2013-184363 filed on Sep. 5, 2013. The entire contents of each of these applications are incorporated herein by reference.

TECHNICAL FIELD

The present disclosure relates to an energy management device, an energy management method, and an energy management system all of which reduce differences in power demand from day to day in the same time period.

BACKGROUND

Recently, various types of power retailers are present. For example in Japan, after a monopoly by a general electric company a long time ago, enforcement of the Revised Electric Business Act has paved the way for partial liberalization of power retailing.

For example, specific scale electric companies (Power Producers and Suppliers: PPS) are permitted to sell power to a heavy consumer whose contract demand is 50 kW or more. The heavy consumer is able to enjoy the merit of reducing the cost of power by selecting an electric company which offers a contract on advantageous terms. In connection with the specific scale electric companies, various techniques targeted for cost reduction have been proposed. (For example, refer to Patent Literature 1.)

FIG. 12 is a conceptual view of power supply from a specific scale electric company to a consumer. A specific scale electric company 220 receives power supply from a power supplier 210. The power supplier herein refers to a company, such as a general electric company, who has a power generation facility.

The specific scale electric company 220 supplies, by way of a transmission and distribution network 230, the power received from the power supplier 210 to a consumer 240 with whom a contract has been made. The transmission and distribution 230 is normally managed by the general electric company.

Because of the need to prepare a power generation plan by estimating the amount of power generation required, the power supplier 210 requests notification in advance, from the specific scale electric company 220, of an estimated value of a power demand for a single day in the unit of, for example, 30 minutes.

When the amount of power (the power demand) that the specific scale electric company 220 is actually supplied from the power supplier 210 is close to (e.g., within ±3% of) the estimated power demand, the specific scale electric company 220 may purchase the power from the power supplier 210 at low cost (i.e., keep imbalance charges relatively low). On the other hand, when, for example, the power demand exceeds the estimated power demand by 3% or more, the power supplier 210 imposes a higher power retail price as a penalty, and the specific scale electric company 220 incurs expensive imbalance charges for the amount of power exceeding the estimated power demand.

Meanwhile, when the power demand is less than the estimated power demand and a surplus occurs, if the surplus is within 3% of the estimated power demand, the power supplier 210 purchases the surplus at a certain level of price. However, if the surplus is as much as 3% or more of the estimated power demand, the power supplier 210 collects the surplus without any purchase price settings. That is to say, the surplus is collected for free. Accordingly, it is preferable for the specific scale electric company 220 not only to simply reduce the power demand but to approximate the power demand to the estimated power demand.

The reason why the power supplier 210 sets relatively low imbalance charges for the cases when the power demand is close to the estimated power demand is that the power supplier 210 may also enjoy merits, such as facilitation of preparation of the power generation plan. Thus, the more the specific scale electric company 220 succeeds in operating at the power demand within a range close to the estimated power demand, the more credibility the estimated value will have, and this in turn allows the power supplier 210 to prepare the power generation plan with a higher precision. Accordingly, by succeeding in operating at the power demand within a range close to the estimated power demand, the specific scale electric company 220 may also reduce the imbalance charges due to the power supplier 210.

CITATION LIST

Patent Literature

Patent Literature 1: Japanese Patent Application Publication No. 2001-327081

SUMMARY

Technical Problems

To reduce the imbalance charges due to the power supplier 210, the specific scale electric company 220 needs to estimate the power demand of the following day with high precision. However, a power consumption greatly varies from day to day even in the same time period, and it has been difficult to estimate with high precision based on the power consumptions in the past.

Furthermore, when the precision of the estimated power demand that the specific scale electric company 220 notifies the power supplier 210 is low and accordingly, when the imbalance charges due to the power supplier 210 become expensive, another problem that the consumer 240 purchases power from the specific scale electric company 220 at a higher cost arises as a result.

Moreover, significant differences in the power demand from day to day in the same time period increases the probability that a difference between the estimated power demand and the actual power demand will exceed the range within which the imbalance charges are kept low, and the specific scale electric company 220 needs to pay the power supplier 210 expensive imbalance charges. The result is that the cost is more likely to be expensive.

Accordingly, the present disclosure, conceived in view of the above problems, is to provide an energy management device, an energy management method, and an energy management system all of which allow the estimation of a future power demand with high precision based on power consumptions in the past.

The present disclosure is also to provide an energy management device, an energy management method, and an energy management system all of which allow reduction in difference between the estimated power demand and the actual power demand.

The present disclosure is also to provide an energy management device, an energy management method, and an energy management system all of which contribute to maintain a favorable power demand-supply balance by reducing differences in power consumption from day to day.

Solution to Problems

One of aspects of the present disclosure for solving the above problems resides in an energy management device, including: a communicator configured to acquire information regarding a power consumption; and a controller configured to calculate a targeted range of a future estimated power demand to be notified to a power company based on the information regarding the power consumption, wherein the controller calculates, for each predetermined time limit, the targeted range based on statistics of the power consumptions acquired over a predetermined number of days.

In a preferred embodiment of the energy management device of the present disclosure, the predetermined time limit is a reference time length used for determining an electricity charge by the power company.

In another preferred embodiment of the energy management device of the present disclosure, the predetermined time limit is a reference time length on a basis of which a basic charge, which is set separately from a monthly metered charge, is defined by the power company.

In yet another preferred embodiment of the energy management device of the present disclosure, the controller calculates an upper limit of the targeted range by adding, to an average value, a value obtained by multiplying a standard deviation by a predetermined coefficient.

In yet another preferred embodiment of the energy management device of the present disclosure, the controller calculates a lower limit of the targeted range by subtracting, from an average value, a value obtained by multiplying a standard deviation by a predetermined coefficient.

In yet another preferred embodiment of the energy management device of the present disclosure, the controller is further configured to control charging and discharging of a storage battery, which is under control of the energy management device, so that the power demand will fall within the targeted range.

In yet another preferred embodiment of the energy management device of the present disclosure, the controller is configured to: calculate, for the predetermined time limit, an average value of change rates of the power consumptions in the past from the power consumptions acquired over the predetermined number of days; calculate, from a power consumption within a short time period immediately after a beginning of the time limit, a current change rate of the power consumption; and based on the change rate of the power consumption in the time limit, control the storage battery so that the power demand will fall within the targeted range.

In yet another preferred embodiment of the energy management device of the present disclosure, the controller controls the storage battery to conduct discharging when the current change rate is greater than the average value of the change rates in the past and when the power demand is likely to exceed an upper limit of the targeted range in the time limit.

In yet another preferred embodiment of the energy management device of the present disclosure, the controller controls the storage battery to conduct charging when the current change rate is less than the average value of the change rates in the past and when the power demand is likely to fall below a lower limit of the targeted range in the time limit.

In yet another preferred embodiment of the energy management device of the present disclosure, the controller switches between discharging and charging in the unit of the predetermined time limit.

In yet another preferred embodiment of the energy management device of the present disclosure, the controller controls the storage battery to stop discharging when, as a result of controlling the storage battery to conduct discharging, the power demand is likely to fall below a lower limit of the targeted range.

In yet another preferred embodiment of the energy management device of the present disclosure, the controller controls the storage battery to stop charging when, as a result of controlling the storage battery to conduct charging, the power demand is likely to exceed an upper limit of the targeted range.

In yet another preferred embodiment of the energy management device of the present disclosure, as the information regarding the power consumption, the controller utilizes data used by a demand controller located outside the energy management device.

In yet another preferred embodiment of the energy management device of the present disclosure, the controller is further configured to control a photovoltaic power generation system, which is under control of the energy management device, so that the power demand will fall within the targeted range.

In yet another preferred embodiment of the energy management device of the present disclosure, the controller increases a proportion of power dedicated to self-consumption among power generated by the photovoltaic power generation system when the power consumption is likely to exceed an upper limit of the targeted range.

In yet another preferred embodiment of the energy management device of the present disclosure, the energy management device further includes an acquisition unit configured to acquire characteristic information of the storage battery, wherein based on the characteristic information of the storage battery, the controller calculates a discharging time period required for the storage battery to discharge a minimum unit of amount of power specified by the power company in calculating an electricity charge, and when monitoring a reference time length used for determining an electricity charge by the power company, the controller determines whether or not to control the storage battery to conduct discharging before a time period calculated by reverse calculation of the discharging time period from an end of the reference time length elapses in the monitored time length.

In yet another preferred embodiment of the energy management device of the present disclosure, the acquisition unit includes a communicator configured to communicate with a storage battery device that is located outside the energy management device and that includes the storage battery.

In yet another preferred embodiment of the energy management device of the present disclosure, the communicator is configured to acquire the characteristic information of the storage battery by way of a power conditioner included in the energy storage device.

In yet another preferred embodiment of the energy management device of the present disclosure, the communicator acquires information regarding a rated output of the storage battery as the characteristic information.

In yet another preferred embodiment of the energy management device of the present disclosure, the communicator acquires the information regarding the rated output by using ECHONET Lite® protocol.

In yet another preferred embodiment of the energy management device of the present disclosure, the predetermined time limit includes a reference time length on a basis of which a basic charge, which is set separately from a monthly metered charge, is defined by the power company.

In yet another preferred embodiment of the energy management device of the present disclosure, the reference time length includes a demand time limit defined by the power company in a contract for a high voltage receiving consumer.

In yet another preferred embodiment of the energy management device of the present disclosure, the minimum unit of amount of power is 1 kWh.

Another aspect of the present disclosure for solving the above problems resides in an energy management method, including: the step of acquiring information regarding a power consumption; and the step of calculating, for each predetermined time limit, a targeted range of a future estimated power demand to be notified to a power company based on statistics of the power consumptions acquired over a predetermined number of days.

Yet another aspect of the present disclosure for solving the above problems resides in an energy management system including an energy management device and a storage battery, wherein the energy management device includes: a communicator configured to acquire information regarding a power consumption; and a controller configured to calculate a targeted range of a future estimated power demand to be notified to a power company based on the information regarding the power consumption, and wherein the controller calculates, for each predetermined time limit, the targeted range based on statistics of the power consumptions acquired over a predetermined number of days and controls the storage battery so that the power demand will fall within the targeted range.

Advantageous Effects

According to the present disclosure, the future power demand is estimated with high precision based on the power consumptions in the past.

Furthermore, according to the present disclosure, the difference between the estimated power demand and the actual power demand is reduced.

Moreover, the present disclosure contributes to maintain a favorable power demand-supply balance by reducing differences in power consumption from day to day.

BRIEF DESCRIPTION OF THE DRAWINGS

In the accompanying drawings:

FIG. 12 is a conceptual view of how a specific scale electric company supplies power to a consumer.

DETAILED DESCRIPTION

Preferred embodiments of the present disclosure will be described below.

First Embodiment

Firstly, a description is given of an outline of an energy management system according to the first embodiment of the present disclosure. The energy management system according to the first embodiment of the present disclosure is an energy management system for energy management in, for example, a single store. A power company 60 of FIG. 1 which is later described corresponds to, for example, a specific scale electric company. A power grid 50 of FIG. 1 represents the power that the power company 60 (e.g., specific scale electric company) purchases from a power supplier, such as a general electric company, to be supplied to a consumer by way of the transmission and distribution network under management of the general electric company.

Figure 1:
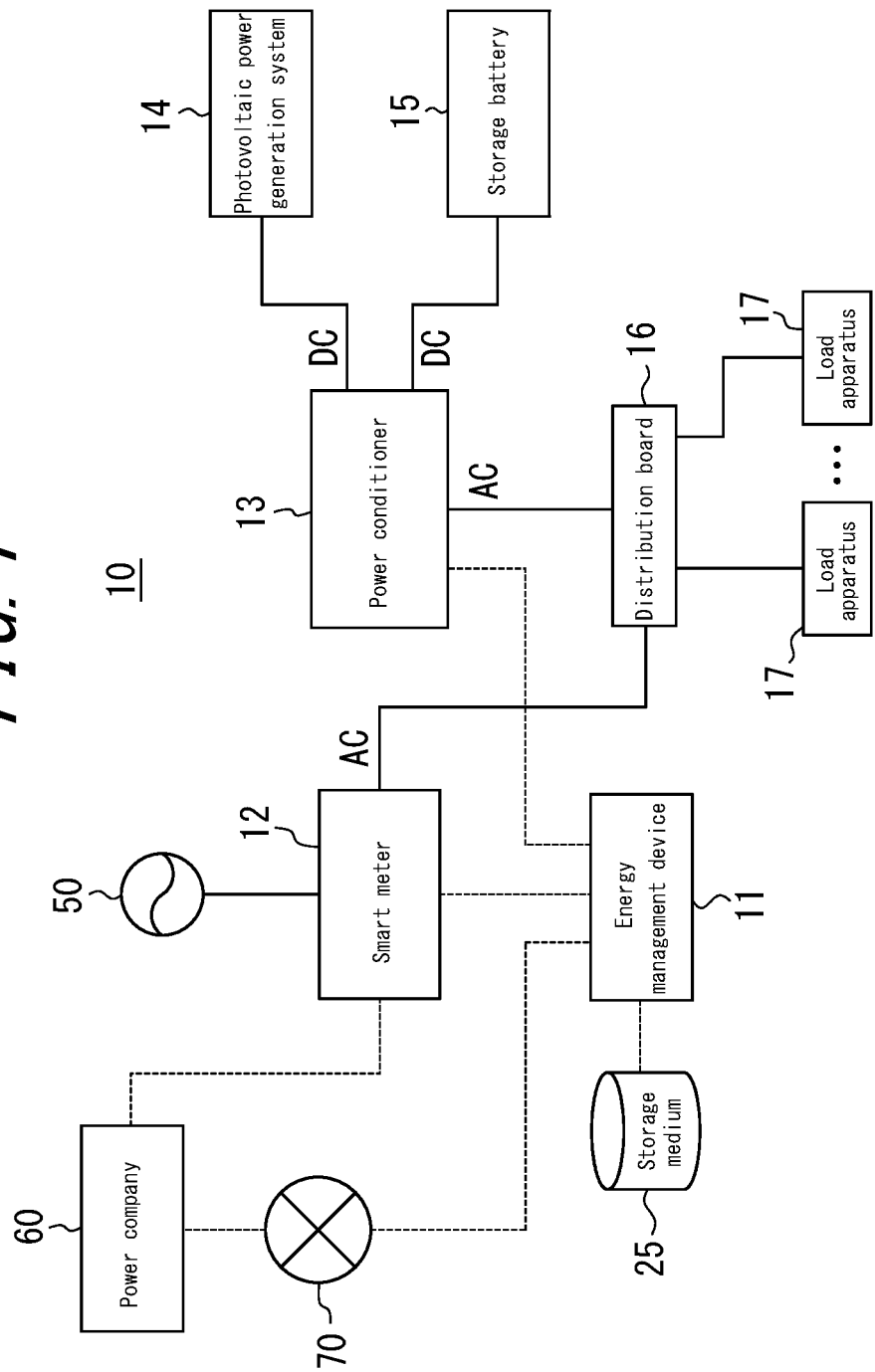
FIG. 1 is a block diagram illustrating a schematic configuration of an energy management system according to the first embodiment of the present disclosure.

FIG. 1 is a block diagram illustrating a schematic configuration of an energy management system according to the first embodiment of the present disclosure. An energy management system 10 according to the first embodiment of the present disclosure includes an energy management device 11, a smart meter 12, a power conditioner 13, a photovoltaic power generation system 14, a storage battery 15, a distribution board 16, and load apparatuses 17.

A solid line connecting functional blocks in FIG. 1 represents a flow of power. A broken line connecting function blocks in FIG. 1 represents a flow of a control signal or information to be communicated. Such communication represented by the broken line may be wired or wireless communication.

A variety of systems may be adopted for layers or the like in communication of a control signal and information. For example, communication using a near field communication technology, such as ZigBee® (ZigBee is a registered trademark in Japan, other countries, or both), may be adopted in communication between the energy management device 11, the smart meter 12, and the power conditioner 13. Moreover, different protocols, for example, a combination of a communication protocol, such as ZigBee SEP2.0 (Smart Energy Profile2.0) and ECHONET Lite® (ECHONET Lite is a registered trademark in Japan, other countries, or both), that has flexibility in the physical layer by defining only the upper layers, and another communication protocol, such as WiFi® (WiFi is a registered trademark in Japan, other countries, or both) and Power Line Communication (PLC), that defines the physical layer may be operated over lower layers including the physical layer.

The energy management system 10 may supply the power supplied from the power grid 50, the power generated by the photovoltaic power generation system 14, and the power that is charged in and discharged from the storage battery 15 to the load apparatuses 17 through the distribution board 16.

The energy management device 11 is, for example, an energy management device that manages energy in a single store. Through the power conditioner 13, the energy management device 11 is configured to manage a self-consumption rate in the power generated by the photovoltaic power generation system 14 and to manage charging and discharging of the storage battery 15. A detailed description of functions of the energy management device 11 is given later below.

The smart meter 12 is connected to the power grid 50 to measure the amount of power (i.e., a power demand) received from the power grid 50. The smart meter 12 also measures the amount of power (i.e., a power consumption) consumed by the load apparatuses 17 or the like included in the energy management system 10. The smart meter 12 may also inform the energy management device 11 of the measured amounts of power.

The power conditioner 13 converts Direct Current (DC) power supplied from the photovoltaic power generation system 14 and the storage battery 15 to Alternate Current (AC) power. The power conditioner 13 also supplies the alternated current power resulting from the conversion to the load apparatuses 17 through the subsidiary circuit branches into which the power has been divided by the distribution board 16.

When there is a surplus in the power generated by the photovoltaic power generation system 14, the power conditioner 13 may also sell the converted alternate current power to an power company through the distribution board 16. The power conditioner 13 may also convert alternate current power supplied from the power grid 50 to direct current power to be charged in the storage battery 15.

The photovoltaic power generation system 14 generates power by using sunlight. Accordingly, the photovoltaic power generation system 14 includes a solar cell and converts energy of sunlight into direct current power. In the present embodiment, the photovoltaic power generation system 14 presupposes an embodiment in which solar panels are disposed on, for example, a house roof for power generation using sunlight. However, in the present disclosure, the photovoltaic power generation system 14 may adopt any technique by which energy of sunlight is converted into power.

The photovoltaic power generation system 14 is under control of the energy management device 11, and the power generated by the photovoltaic power generation system 14, after converted into alternate current power by the power conditioner 13, may be supplied to the load apparatuses 17 and/or sold to a power company. Furthermore, the power generated by the photovoltaic power generation system 14 may be used to charge the storage battery 15 and may be supplied to the load apparatuses 17 still in the form of direct current.

The storage battery 15 is under control of the energy management device 11, and the storage battery 15 may supply power to the load apparatuses 17 by discharging the power charged therein. The storage battery 15 may also charge the power received from the power grid 50, the photovoltaic power generation system 14, or the like. As illustrated in FIG. 1, the power discharged from the storage battery 15 may also be supplied to the load apparatuses 17 and the energy management device 11.

The distribution board 16 divides the supplied power into the plurality of subsidiary circuit branches for distribution to the load apparatuses 17.

In FIG. 1, any number of the load apparatuses 17 may be connected to the energy management system 10. The load apparatuses 17 are connected to the power conditioner 13 through the distribution board 16 to be supplied with power.

Figure 2:
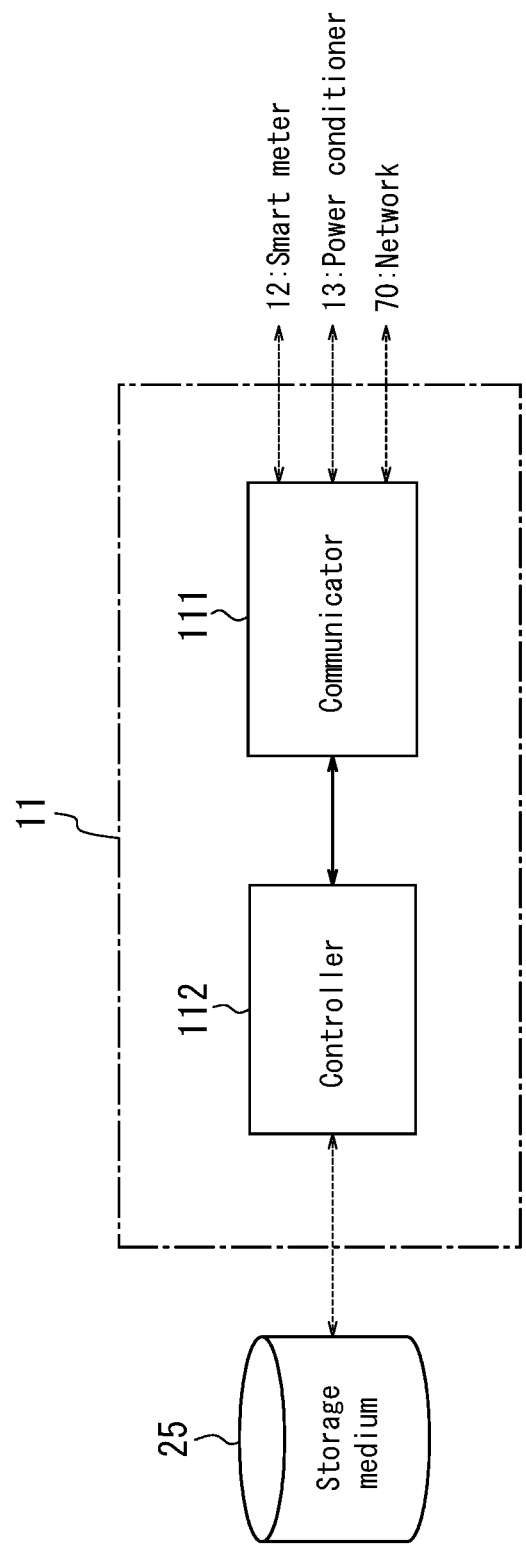
FIG. 2 is a block diagram illustrating a schematic configuration of an energy management device according to the first embodiment of the present disclosure.

The following describes in detail operations of the energy management device 11. FIG. 2 is a block diagram illustrating a schematic configuration of an energy management device according to the first embodiment of the present disclosure. The energy management device 11 includes a communicator 111 and a controller 112.

The communicator 111 acquires, from the smart meter 12, information regarding a power consumption consumed by the load apparatuses 17 located, for example, in a store that the energy management system 10 manages. The communicator 111 may also acquire the information regarding the power consumption from a demand controller which is not illustrated and located outside the energy management device 11.

The controller 112 controls a storage medium 25 to store the information regarding the power consumption acquired by the communicator 111. The storage medium 25 may be connected externally to the energy management device 11 or may be included in the energy management device 11.

Figure 3:
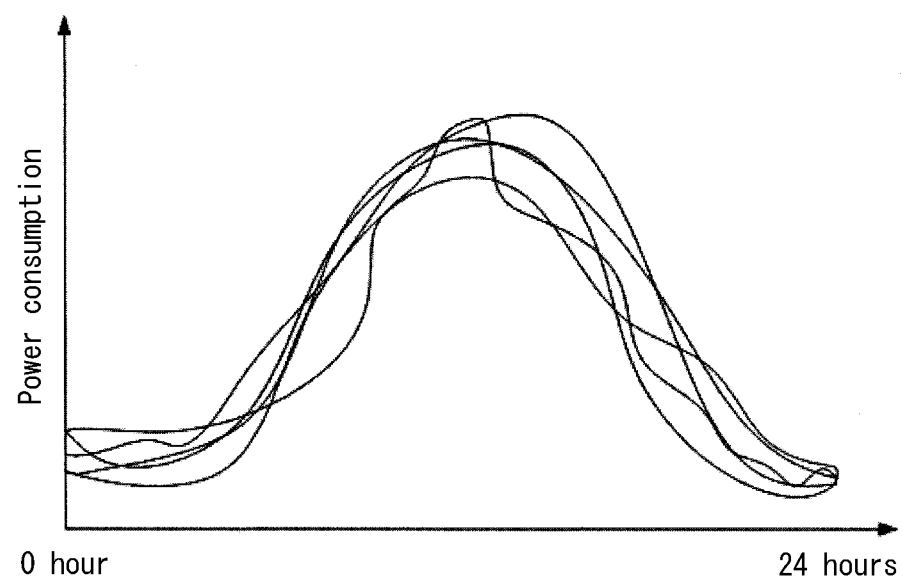
FIG. 3 illustrates, for each of several days, an example of fluctuation of a power consumption during the day.

FIG. 3 illustrates, in an overlapped manner, examples of the information regarding the power consumption acquired by the communicator 111 over 5 days. As illustrated in FIG. 3, the power consumption in the energy management system 10 normally varies from day to day.

Figure 4:
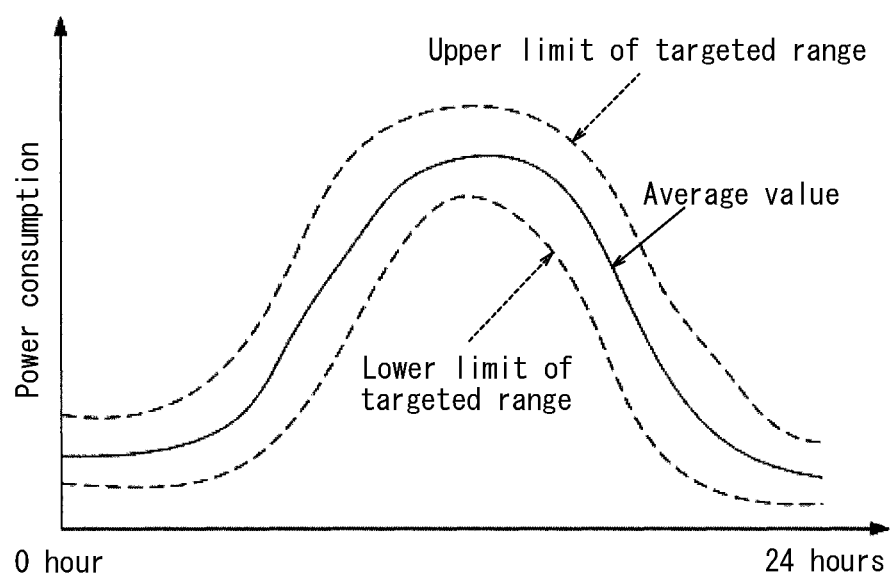
FIG. 4 illustrates an example of a targeted range of a power demand.

FIG. 4 is a graph of examples of an average value and a targeted range per predetermined time limit that are calculated from the data illustrated in FIG. 3. A solid line represents the average value, and broken lines represent the upper and the lower limit of the targeted range.

The predetermined time limit herein refers to a reference time length used for determining an electric charge when the store that the energy management system 10 manages makes a contract with the power company 60. For example, the predetermined time limit is the unit of time, such as 30 minutes. The time limit is also called a demand time limit, and the time limit refers to a reference time limit on the basis of which a basic charge is defined. A monthly metered charge is also calculated based on an amount of power used per demand time limit.

The controller 112 calculates, for each predetermined time limit, the targeted range based on statistics of the power consumptions acquired over the past predetermined number of days. The following describes an example of a method of the calculation in detail.

The controller 112 averages, for each time limit, the data of the power consumptions acquired over the past predetermined number of days to calculate the average value. For example, the controller 112 calculates an average value of power consumptions in the time limit of 9 a.m. to 9:30 a.m. by averaging the data acquired over the most recent past 14 days with respect to the time limit of 9 a.m. to 9:30 a.m.

When the demand time limit is 30 minutes, 1 day consists of 48 time limits. In this case, the controller 112 calculates an average value for each of the 48 time limits by the above method.

The controller 112 also calculates, for each time limit, a standard deviation from the data of the power consumptions acquired over the past predetermined number of days. For example, the controller 112 calculates a standard deviation of power consumptions in the time limit of 9 a.m. to 9:30 a.m. from the data acquired over the most recent past 14 days with respect to the time limit of 9 a.m. to 9:30 a.m.

The controller 112 calculates, for each time limit, the upper limit of the targeted range by, for example, the following formula.

[Formula 1]

$$P_1 = P_a + \alpha \cdot \sigma \quad (1)$$

In the formula (1), $P_1$ represents the upper limit of the target range of the power demand, and $P_a$ represents the average value of the power consumptions, and $\sigma$ represents the standard deviation of the power consumptions, and $\alpha$ represents a predetermined coefficient. The predetermined coefficient $\alpha$ is a value determined to ensure charging and discharging of the storage battery 15 within the scope of the specification of the storage battery 15.

The controller 112 calculates, for each time limit, the lower limit of the targeted range by, for example, the following formula.

[Formula 2]

$$P_2 = P_a - \beta \cdot \sigma \quad (2)$$

In the formula (2), $P_2$ represents the lower limit of the target range of the power demand, and $P_a$ represents the average value of the power consumptions, and $\sigma$ represents the standard deviation of the power consumptions, and $\beta$ represents a predetermined coefficient. The predetermined coefficient $\beta$ is a value determined to ensure charging and discharging of the storage battery 15 within the scope of the specification of the storage battery 15. The coefficient $\beta$ may be a value that is the same as or different from the coefficient $\alpha$.

The controller 112 notifies the power company 60 of data within the targeted range as a future estimated power demand, for example, an estimated power demand of the following day. For example, the controller 112 may set the average value as the estimated power demand.

The controller 112 may notify the power company 60 of the estimated power demand by way of the smart meter 12 or may notify the power company 60 of the estimated power demand by way of the network 70. Additionally, the power company 60 organizes the estimated power demands notified from a plurality of consumers with which the power company 60 have contracts and notifies the power supplier, such as a general electric company, of an overall estimated power demand from the power company 60.

The controller 112 updates the targeted range everyday. That is to say, upon acquisition of new power consumption data for a single day, the controller 112 replaces the oldest power consumption data for a single day with the acquired new power consumption data and calculates the average value of the power consumptions, the upper limit of the targeted range, and the lower limit of the targeted range. The controller 112 does not necessarily need to update the targeted range everyday, and update frequency may be adjusted as appropriate, such as every few days.

After calculating the targeted range, the controller 112 controls the storage battery 15 through the power conditioner 13 so that the actual power demand will fall within the targeted range. In detail, when the power consumption is likely to exceed the upper limit of the targeted range, the controller 112 controls the storage battery 15 to conduct discharging to reduce the power received from the power grid 50. When the power consumption is likely to fall below the lower limit of the targeted range, the controller 112 controls the storage battery 15 to conduct charging to increase the power received from the power grid 50.

Figure 5:
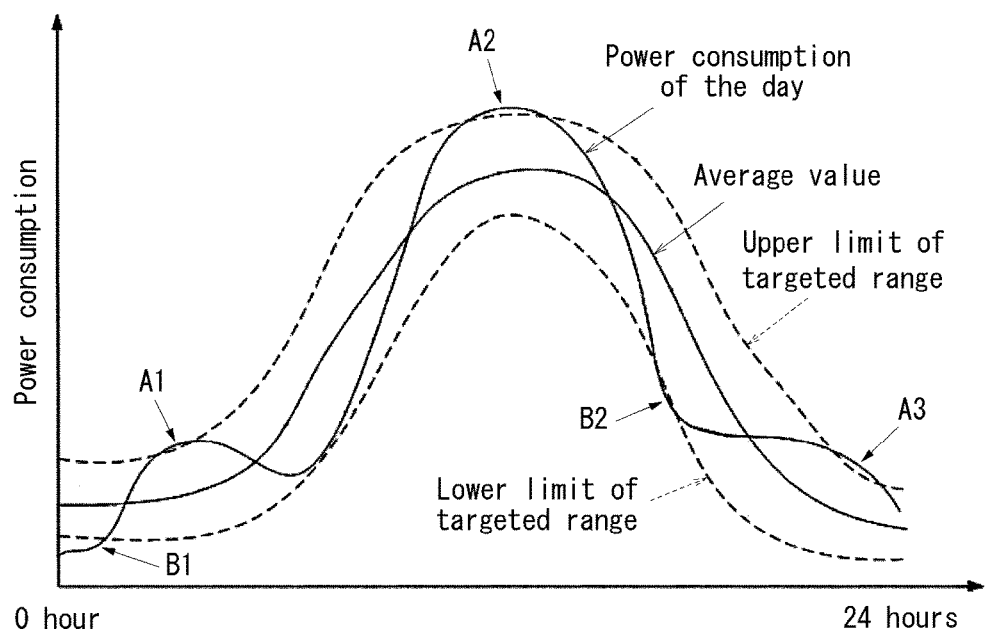
FIG. 5 illustrates how a storage battery is discharged or charged so that a power demand will fall within a targeted range.

FIG. 5 illustrates how the controller 112 controls the storage battery 15 so that the power demand will fall within the targeted range.

In the states indicated by reference signs A1, A2, and A3 in FIG. 5, that is to say, in the states where the power consumption of the day is likely to exceed the upper limit of the targeted range, the controller 112 controls the storage battery 15 to conduct discharging to reduce the power demand received from the power grid 50.

In the states indicated by reference signs B1 and B2 in FIG. 5, that is to say, in the states where the power consumption of the day is likely to fall below the lower limit of the targeted range, the controller 112 controls the storage battery 15 to conduct charging to increase the power demand received from the power grid 50.

By such control over the storage battery 15 by the controller 112 included in the energy management device 11, the power demand is balanced out within the targeted range.

Additionally, when the power consumption is likely to exceed the upper limit of the targeted range, the controller 112 may also increase a proportion of the power dedicated to self-consumption among the power generated by the photovoltaic power generation system 14, instead of controlling the storage battery 15 to conduct discharging or in addition to control the storage battery 15 to conduct discharging. That is to say, the controller 112 controls the power conditioner 13 so that the amount of power that the photovoltaic power generation system 14 sells to the power company is reduced and that the amount of power used by the load apparatuses 17 is increased.

Figure 6:
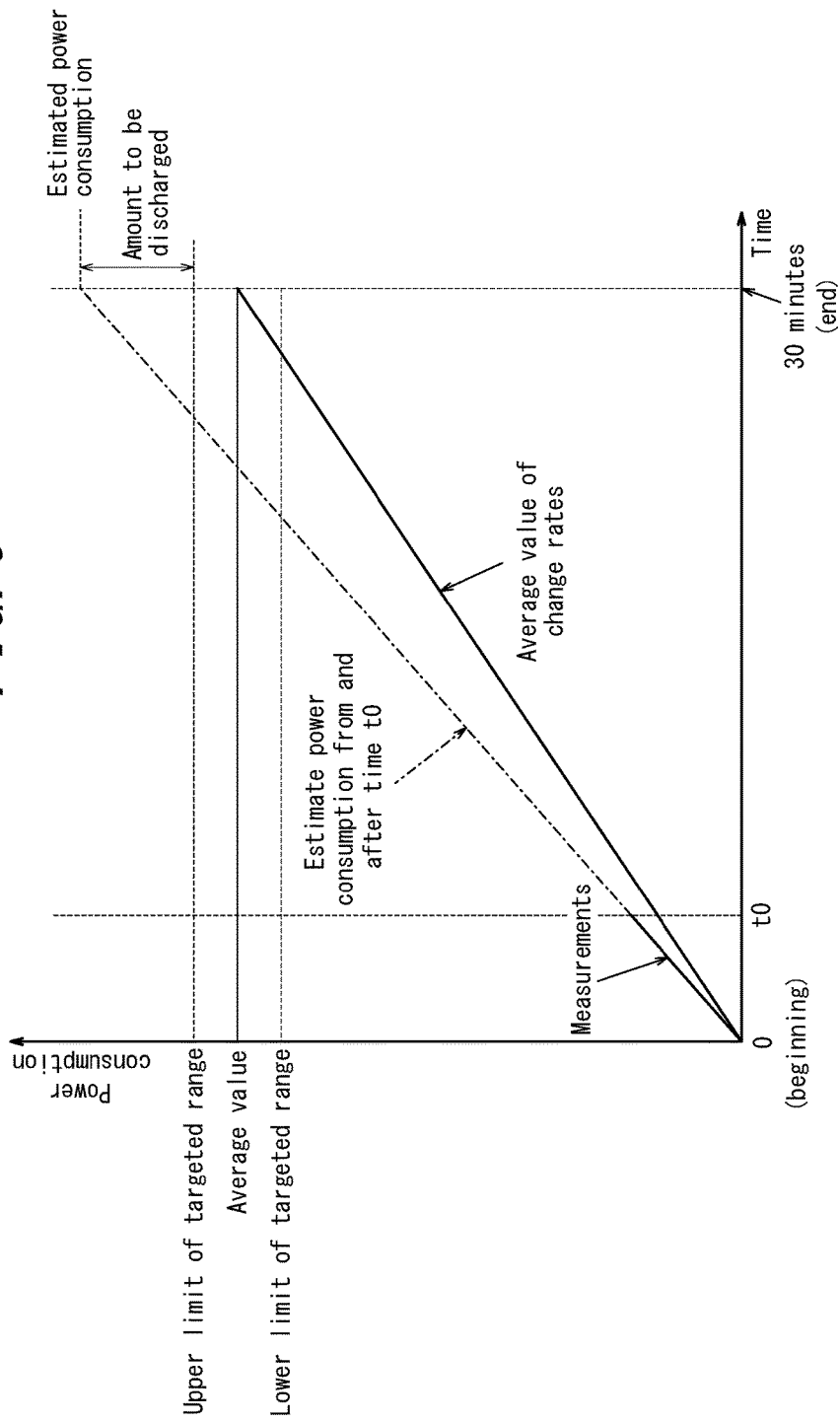
FIG. 6 illustrates an example where a power consumption is expected to exceed the upper limit of a targeted range.

FIG. 6 is a graph with a horizontal axis representing time and a vertical axis representing a power consumption. The horizontal axis ranges from start to end of a certain demand limit. In the description below, time at which the demand time limit starts is called the beginning of the demand time limit, and time at which the demand time limit ends is called the end of the demand time limit. FIG. 6 is a graph of a time period of 30 minutes, for example, from 9 a.m. to 9:30 a.m., illustrating an example where the demand time limit is 30 minutes. The demand time limit of 30 minutes is merely for illustration, and the demand time limit is not limited to 30 minutes.

The vertical axis represents the power consumption within the demand time limit and scaled from 0, which indicates the power consumption at the beginning of the demand time limit.

The average value of change rates of the power consumptions of FIG. 6 is obtained by averaging out straight lines corresponding to the past predetermined number of days (e.g., 14 days), each straight line connecting the corresponding power consumptions at the beginning and the end of the demand time limit. The controller 112 calculates, for each time limit, the average value of the change rates of the power consumptions based on the data of the power consumptions acquired over the past predetermined number of days.

From the power consumption in a short time period from the beginning to the predetermined time t0 within the demand time limit, the controller 112 calculates the current change rate of the power consumption and estimates the power consumption at the end of the demand time limit. In the example of FIG. 6, the current change rate of the power consumption exceeds the average value of the change rates of the power consumptions in the past, and the estimated power consumption exceeds the upper limit of the targeted range. In this example, the controller 112 controls the storage battery 15 to conduct discharging for the amount by which the estimated power consumption exceeds the upper limit of the targeted range, so that the power demand will not exceed the upper limit of the targeted range.

After controlling the storage battery 15 to conduct discharging, the controller 112 maintains the discharging of the storage battery 15 until the end of the demand time limit.

The controller 112 continues to monitor the power consumption even after controlling the storage battery 15 to conduct discharging due to the estimated power consumption exceeding the upper limit of the targeted range. For example, when, as a result of controlling the storage battery 15 to conduct discharging, the power consumption is reduced more than expected and the power consumption is likely to fall below the lower limit of the targeted range, the controller 112 controls the storage battery 15 to stop discharging.

Subsequently, with reference to FIG. 7, a description is given of an example of operations, performed by the controller 112, to control the storage battery 15 to conduct charging when the power consumption of the day is likely to fall below the lower limit of the targeted range.

From the power consumption in the short time period from the beginning to the predetermined time t0 within the demand time limit, the controller 112 calculates the current change rate of the power consumption and estimates the power consumption at the end of the demand time limit. In the example of FIG. 7, the current change rate of the power consumption is less than the average value of the change rates of the power consumptions in the past, and the estimated power consumption falls below the lower limit of the targeted range. In this example, the controller 112 controls the storage battery 15 to conduct charging for the amount by which the estimated power consumption falls below the lower limit of the targeted range, so that the power demand will not fall below the lower limit of the targeted range.

After controlling the storage battery 15 to conduct charging, the controller 112 maintains the charging of the storage battery 15 until the end of the demand time limit.

The controller 112 continues to monitor the power consumption even after controlling the storage battery 15 to conduct charging due to the estimated power consumption falling below the lower limit of the targeted range. For example, when, as a result of controlling the storage battery 15 to conduct charging, the power consumption is increased more than expected and the power consumption is likely to exceed the upper limit of the targeted range, the controller 112 controls the storage battery 15 to stop charging.

Figure 7:
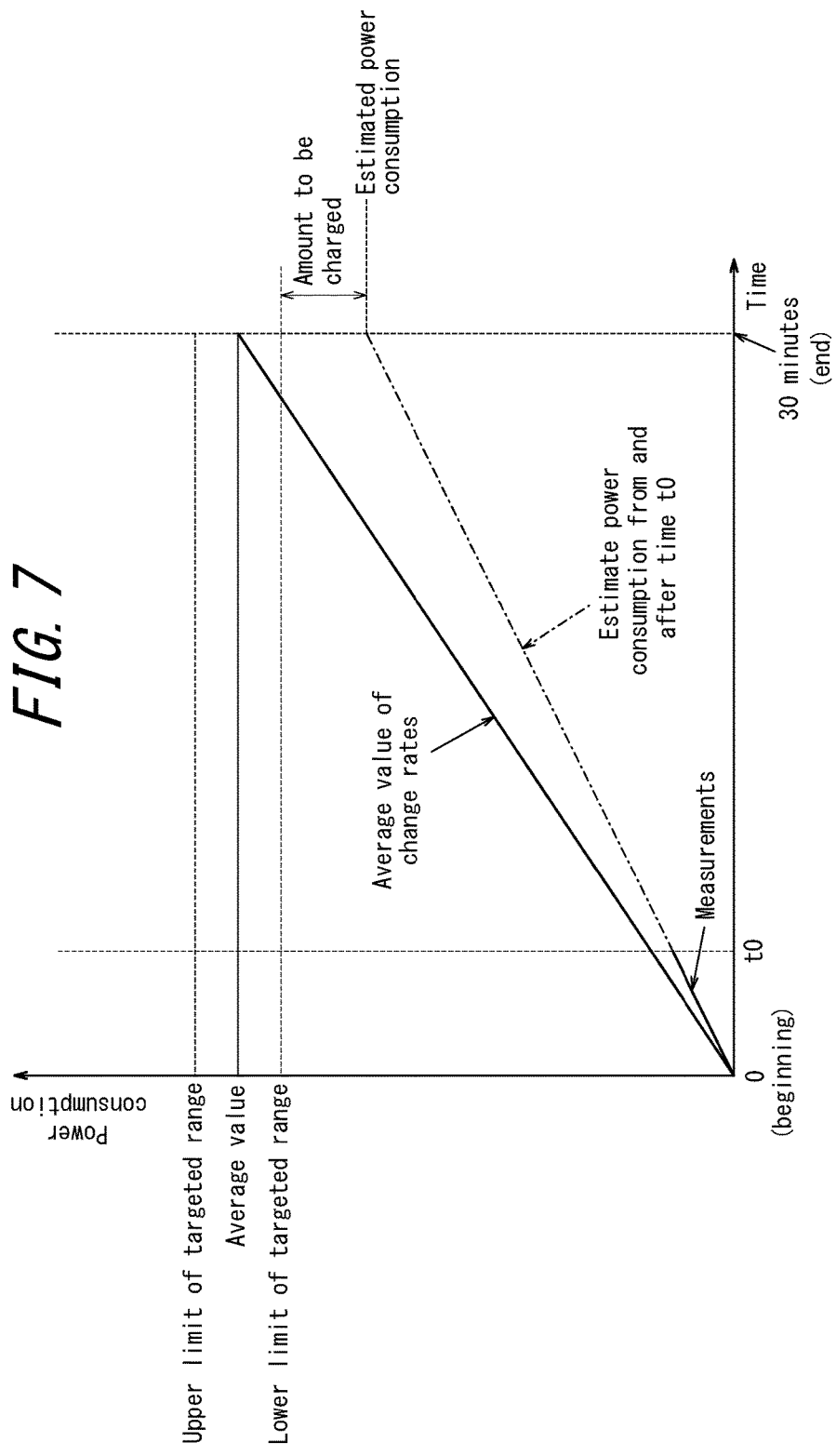
FIG. 7 illustrates an example where a power consumption is expected to fall below the lower limit of a targeted range.

Although in the examples of FIGS. 6 and 7 the controller 112 estimates the power consumption at the end of the demand time limit on the assumption that the change rate of the power consumption calculated for the time period from the beginning to time t0 in the demand time limit will last until the end of the demand time limit, the method of estimating the power consumption is not limited to these examples. For example, the controller 112 may estimate the power consumption at the end of the demand time limit by using power consumptions measured at a greater number of measurement points and approximating the measurements by a function of higher order.

Furthermore, although in the examples of FIGS. 6 and 7 the controller 112 estimates the power consumption at the end of the demand time limit based on an inclination in the time period from the beginning to time t0 in the demand time limit, this time range is merely an example, and the present embodiment is not limited to this example. For example, the controller 112 may also estimate the power consumption by using power consumption data in a time limit prior to the beginning of the demand time limit. In detail, for example, when estimating the power consumption in the time period from 9 to 9:30, the controller 112 may estimate the power consumption by using power consumption data in the time period from 8:30 to 9 or power consumption data in a further previous demand time limit.

By such control over the storage battery 15 by the controller 112 included in the energy management device 11, the power demand is balanced out within the targeted range.

Thus, according to the present embodiment, the energy management device 11 calculates, for each predetermined time limit, the targeted range of the future estimated power demand based on the statistics of the power consumptions acquired over a predetermined number of days, thereby allowing estimation of the future power demand with high precision from the power consumptions in the past. Furthermore, the power company 60, upon notification of the estimated power demand estimated with high precision from the energy management device 11 in each consumer with whom a contract has been made, may estimate the overall future power demand of the power company 60 with high precision. This allows the power company 60 to receive power supply from the power supplier, such as a general electric company, at a low cost. Moreover, the fact that the power company 60 may receive power supply from the power supplier at a low cost in turn makes it more likely that the consumers may make a contract with the power company on advantageous terms. Consequently, the cost of power is expected to be reduced. It is also preferable for the power supplier to be notified of the estimated power demand estimated with high precision from the power company 60 because this facilitates preparation of a power generation plan.

Moreover, by the energy management device 11 calculating the upper limit of the targeted range by adding, to the average value, the value obtained by multiplying the standard deviation by the predetermined coefficient, the targeted range is set suitably.

Moreover, by the energy management device 11 calculating the lower limit of the targeted range by subtracting, from the average value, the value obtained by multiplying the standard deviation by the predetermined coefficient, the targeted range is set suitably.

Moreover, by the energy management device 11 controlling the storage battery 15 under the control of the energy management device 11 so that the power consumption will fall within the targeted range, differences in power demand from day to day in the same time period are reduced, and the power demand may be grasped easily.

Moreover, by the energy management device 11 controlling the storage battery 15 to conduct discharging when the power consumption is likely to exceed the upper limit of the targeted range and also controlling the storage battery 15 to conduct charging when the power consumption is likely to fall below the targeted range, differences in power demand from day to day in the same time period are reduced, and the power demand may be grasped easily.

Moreover, by the energy management device 11 controlling the photovoltaic power generation system 14 under control of the energy management device 11 so that the power demand will fall within the targeted range, differences in power demand from day to day in the same time period are reduced, and the power demand may be grasped easily.

Moreover, by the energy management device 11 increasing a proportion of the power dedicated to self-consumption among the power generated by the photovoltaic power generation system 14 when the power consumption is likely to exceed the upper limit of the targeted range, differences in power demand from day to day in the same time period are reduced, and the power demand may be grasped easily.

Moreover, according to the present embodiment, the energy management device 11 calculates the targeted range of the future estimated power demand and controls the storage battery 15 so that the power demand will fall within the targeted range, differences in power demand from day to day in the same time period are reduced. Moreover, as a result of the energy management device 11 reducing the differences in power demand from day to day in the same time period in each consumer with whom a contract has been made, the power company 60 may reduce differences in overall power demand of the power company 60 with high precision. This allows the power company 60 to receive power supply from the power supplier, such as a general electric company, at a low cost. Moreover, the fact that the power company 60 may receive power supply from the power supplier at a low cost in turn makes it more likely that the consumers may make a contract with the power company on advantageous terms. Consequently, the cost of power is expected to be reduced. It is also preferable for the power supplier to reduce differences in power demand from day to day in the same time period because this facilitates preparation of a power generation plan.

Moreover, by the energy management device 11 calculating the average value of the change rates of the power consumptions in the past per unit of the predetermined time limit, calculating the current change rate of the power consumption from the power consumption within a short time period immediately after the beginning of each time limit, and controlling the storage battery 15 based on the change rate of the power consumption in each time limit so that the power demand will fall within the targeted range, differences in power demand from day to day in the same time period are reduced, and the power demand may be grasped easily.

Moreover, by the energy management device 11 controlling, when the current change rate is greater than the average value of the change rates in the past and when the power demand is likely to exceed the upper limit of the targeted range, the storage battery 15 to conduct discharging and also controlling, when the current change rate is less than the average value of the change rates in the past and when the power demand is likely to fall below the lower limit of the targeted range, the storage battery 15 to conduct charging, differences in power demand from day to day in the same time period are reduced, and the power demand may be grasped easily.

Figure 8:
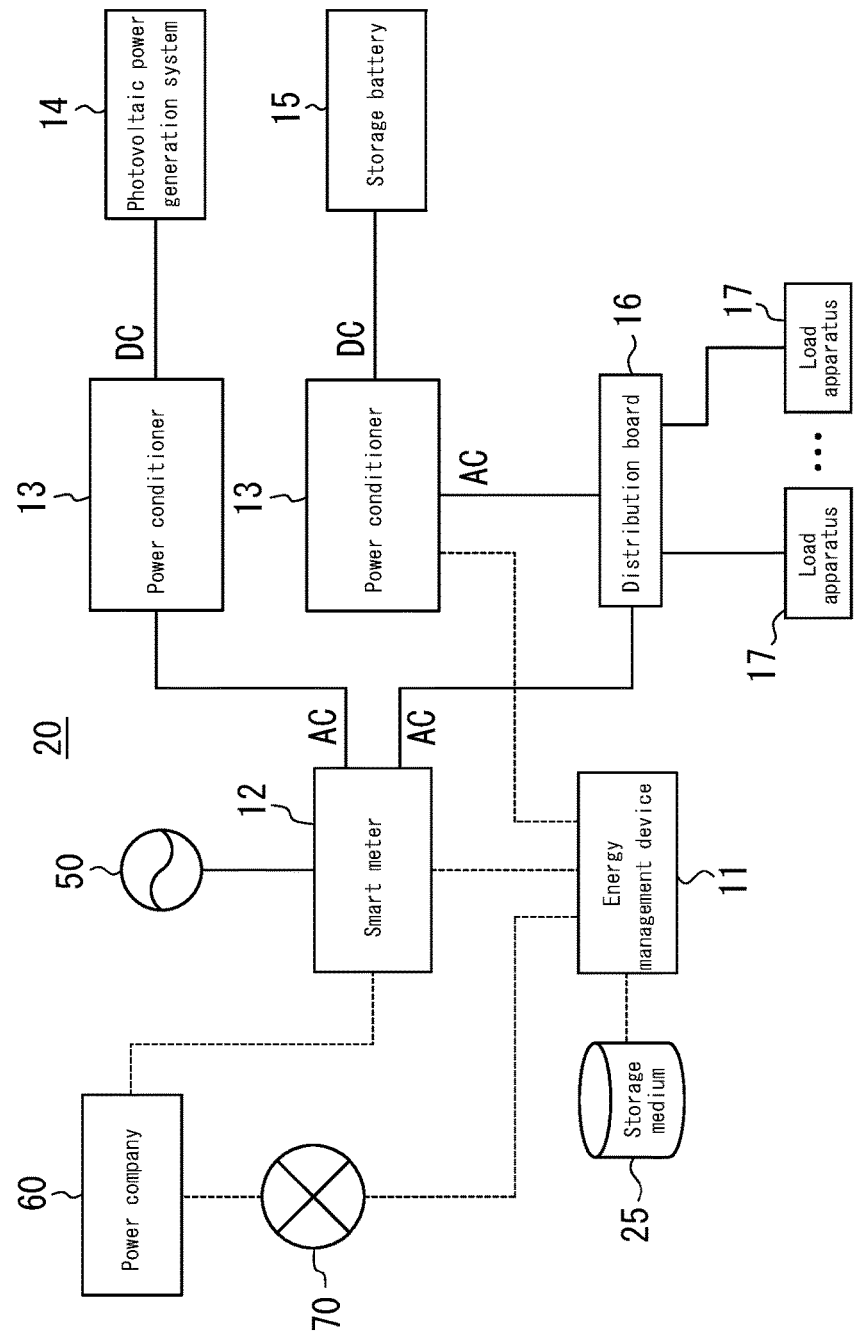
FIG. 8 is a block diagram illustrating a schematic configuration of an energy management system according to another embodiment of the present disclosure.

Additionally, the present embodiment is described with reference to the exemplary system configuration assuming that a surplus available in the power generated by the photovoltaic power generation system 14 is sold to the power company. However, any other system configuration may be adopted for controlling the storage battery 15. That is to say, even when a system configuration that corresponds to a full amount purchase system as illustrated in FIG. 8 is adopted, the storage battery 15 is preferably controlled to conduct charging and discharging similarly.

Second Embodiment

In the second embodiment, blocks having similar functions to those in the first embodiment are assigned with the same reference signs, and a description of common features is omitted.

Figure 9:
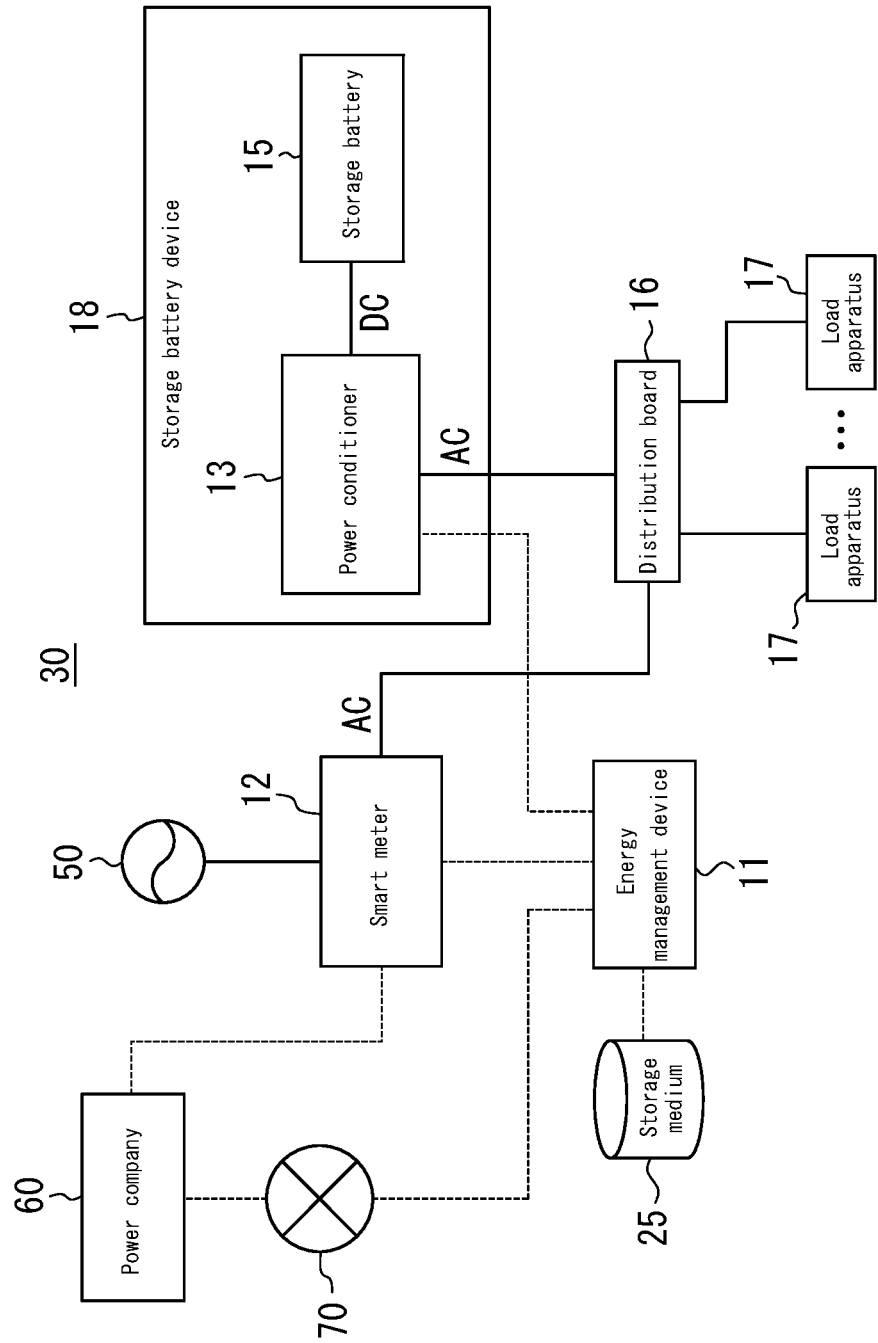
FIG. 9 is a block diagram illustrating a schematic configuration of an energy management system according to the second embodiment of the present disclosure.

FIG. 9 is a block diagram illustrating a schematic configuration of an energy management system according to the second embodiment of the present disclosure. An energy management system 30 according to the second embodiment of the present disclosure includes the energy management device 11, the smart meter 12, a storage battery device 18, the distribution board 16, and the load apparatuses 17. The storage battery device 18 includes the power conditioner 13 and the storage battery 15.

The energy management system 30 may supply the power supplied from the power grid 50 and the power that is charged in and discharged from the storage battery 15 to the load apparatuses 17 through the distribution board 16.

The energy management device 11 is, for example, an energy management device that manages energy in a single store. Through the power conditioner 13, the energy management device 11 manages charging and discharging of the storage battery 15. A detailed description of functions of the energy management device 11 is given later below.

The storage battery device 18 includes the power conditioner 13 and the storage battery 15. Although FIG. 9 illustrates a device located outside a housing of the energy management device 11 as the storage battery device 18, the storage battery device 18 may be included in the housing of the energy management device 11.

The power conditioner 13 converts Direct Current (DC) power supplied from the storage battery 15 to Alternate Current (AC) power. The power conditioner 13 also supplies the alternated current power resulting from the conversion to the load apparatuses 17 through the subsidiary circuit branches into which the power has been divided by the distribution board 16.

The power conditioner 13 may also convert alternate current power supplied from the power grid 50 to direct current power to be charged in the storage battery 15.

The storage battery 15 is under control of the energy management device 11, and the storage battery 15 may supply power to the load apparatuses 17 by discharging the power charged therein. The storage battery 15 may also charge the power received from the power grid 50. As illustrated in FIG. 9, the power discharged from the storage battery 15 may also be supplied to the load apparatuses 17.

Figure 10:
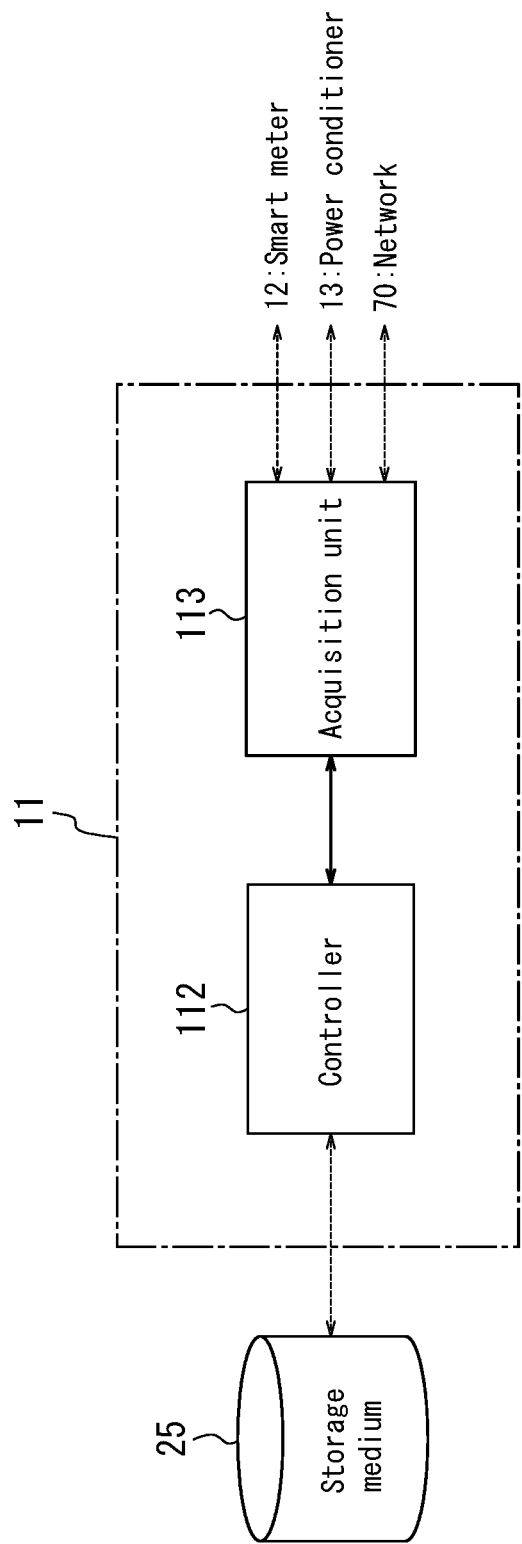
FIG. 10 is a block diagram illustrating a schematic configuration of an energy management device according to the second embodiment of the present disclosure.

The following describes in detail operations of the energy management device 11. FIG. 10 is a block diagram illustrating a schematic configuration of an energy management device according to the second embodiment of the present disclosure. The energy management device 11 includes an acquisition unit 113 and the controller 112.

The acquisition unit 113 acquires characteristic information of the storage battery 15 by way of the power conditioner 13. The characteristic information of the storage battery 15 includes information regarding a rated output, a capacity, or the like of the storage battery 15. The acquisition unit 113 includes a communicator, and when the storage battery device 18 is located outside the housing of the energy management device 11, the acquisition unit 113 communicates with the power conditioner 13 included in the storage battery device 18 through the communicator.

The communicator 113 acquires, from the smart meter 12, information regarding a power consumption consumed by the load apparatuses 17 located, for example, in a store that the energy management system 30 manages.

The controller 112 controls the storage medium 25 to store the information regarding the power consumption acquired by the communicator 111. The storage medium 25 may be connected externally to the energy management device 11 or may be included in the energy management device 11.

Through the power conditioner 13, the controller 112 controls the storage battery 15 to conduct discharging or charging.

Here, the amount of power referred to when the controller 112 controls the storage battery 15 to conduct discharging or charging is examined.

A contract on electricity charge is made between the specific scale electric company 220 and the power supplier 210 on the basis of a predetermined reference time length. The predetermined reference time length is also called the demand time limit and is the unit of time, such as 30 minutes. The demand time limit is a time length on the basis of which a basic charge is defined. A monthly metered charge is also calculated based on an amount of power used per demand time limit.

The amount of power in the demand time limit is dealt with the unit defined by the minimum amount of power specified by the power supplier 210. The minimum unit of amount of power is, for example, 1 kWh. In this case, even when, for example, a power demand less than 1 kWh is reduced in the demand time limit, the effect of reducing the amount of power sometimes does not appear in terms of the contract. For example, even when a power demand of 55.4 kWh is reduced by 0.7 kWh to 54.7 kWh, since the minimum unit of amount of power is 1 kWh, the both are dealt as 55 kWh. Accordingly, the reduction in amount of power is not reflected in the charge.

Thus, to reduce the power charge by reducing the power demand by an amount sufficient to render the reduction meaningful in terms of the contract on power, the amount of power that is greater than or equal to the minimum unit of amount of power (e.g., 1 kWh) needs to be reduced within the demand time limit.

Accordingly, when controlling the storage battery 15 to conduct discharging or charging, the controller 112 controls the storage battery 15 to discharge or charge during the reference time length at least the minimum unit of amount of power (e.g., 1 kWh) specified by the power company 60 in calculating the electricity charge. This is illustrated in FIG. 11.

Figure 11A:
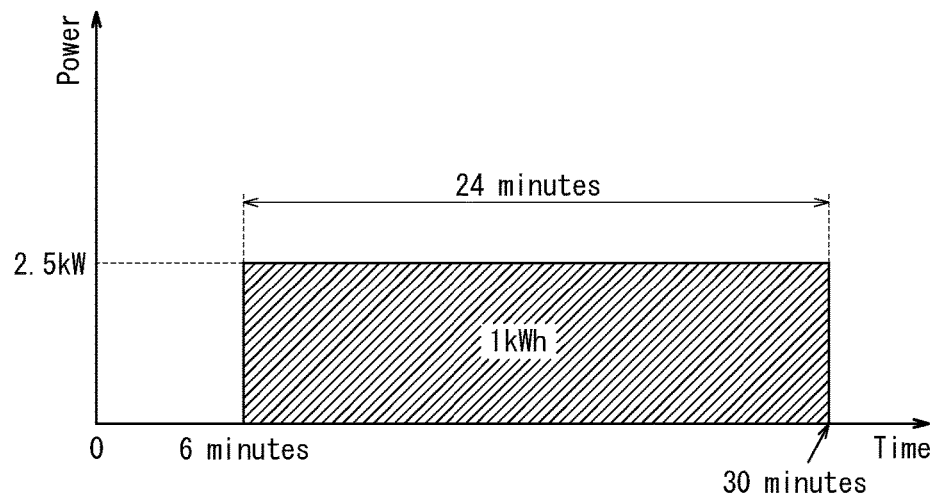
FIGS. 11A and 11B each illustrate a state where a storage battery discharges the minimum unit of amount of power.

FIG. 11A illustrates a case where the acquisition unit 113 acquires from the storage battery 15 the information of the rated output of the storage battery 15, which indicates 2.5 kW. In this case, based on the acquired information of the rated output of 2.5 kW, the controller 112 calculates that 24 minutes of discharging is required as a discharging time period in order to control the storage battery 15 to discharge the minimum unit of amount of power of 1 kWh. Subsequently, the controller 112 calculates that, to discharge the minimum unit of amount of power of 1 kWh, the storage battery 15 needs to be started to discharge before 6 minutes elapses from the beginning of the reference time length by reverse calculation (30 minutes minus 24 minutes) from the end of the reference time length, namely, 30 minutes. Based on this result, the controller 112 determines whether or not to control the storage battery 15 to conduct discharging before 6 minutes elapses from the beginning of the reference time length.

Figure 11B:
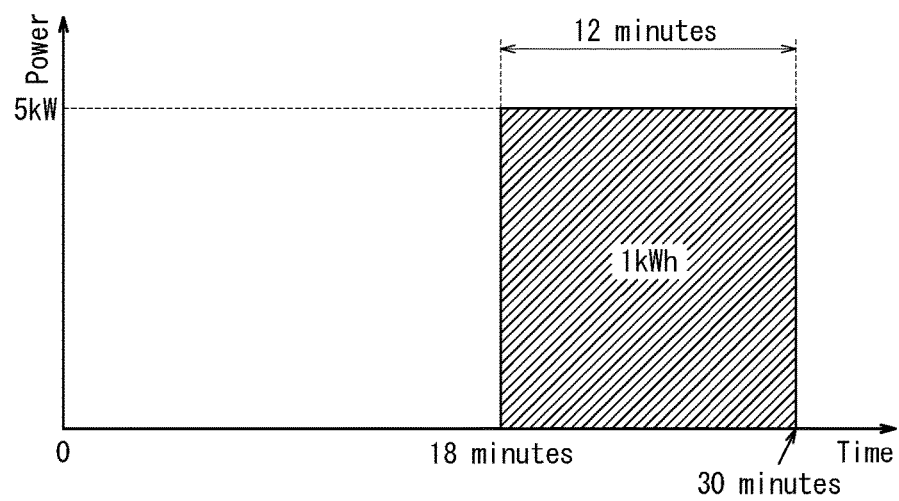

FIG. 11B illustrates a case where the acquisition unit 113 has acquired from the storage battery 15 the information of the rated output of the storage battery 15, which indicates 5 kW. In this case, based on the acquired information of the rated output of 5 kW, the controller 112 calculates that 12 minutes of discharging is required as the discharging time period in order to control the storage battery 15 to discharge the minimum unit of amount of power of 1 kWh. Subsequently, the controller 112 calculates that, to discharge the minimum unit of amount of power of 1 kWh, the storage battery 15 needs to be started to discharge before 18 minutes elapses from the beginning of the reference time length by reverse calculation (30 minutes minus 12 minutes) from the end of the reference time length, namely, 30 minutes. Based on this result, the controller 112 determines whether or not to control the storage battery 15 to conduct discharging before 18 minutes elapses from the beginning of the reference time length.

FIGS. 11A and 11B each illustrate the case where the controller 112 controls the storage battery 15 to discharge the minimum unit of amount of power of 1 kWh. However, in cases where the storage battery 15 is controlled to discharge the amount of power corresponding to an integral multiple of (e.g., twice or three times) the minimum unit of amount of power, the controller 112 may also calculate how many minutes may elapse since the beginning of the reference time length before starting the storage battery 15 to discharge in a similar manner.

Although FIGS. 11A and 11B each illustrate the case where the single storage battery 15 is used, even in cases where the energy storage 15 is provided in plurality, by taking into account an overall rated output of the plurality of the storage batteries 15, the controller 112 may calculate how many minutes may elapse since the beginning of the reference time length before starting the storage battery 15 to discharge.

In this way, according to the present embodiment, from the characteristic information of the storage battery 15, the energy management device 11 calculates the discharging time period required for the storage battery 15 to discharge the minimum unit of amount of power and determines whether or not to control the storage battery 15 to conduct discharging before elapse of a time period obtained by reverse calculation of the calculated discharging time period from the end of the reference time length (demand time limit). Accordingly, when reducing the power demand in the demand time limit, the energy management device 11 may reduce the amount of power that is greater than or equal to the minimum unit of amount of power. Consequently, the energy management device 11 contributes to maintain a favorable power demand-supply balance by reducing differences in power consumption from day to day.

Additionally, the present embodiment is described with reference to the exemplary cases where the storage battery is controlled so that the power demand will fall within the targeted range. However, the present disclosure may also be adopted in cases where the contract with the power supplier adopts a simple metered charging system and where simply the amount of power used is desired to be reduced.

Although the present disclosure has been described based on the drawings and the embodiments thereof, it is to be noted that a person skilled in the art may easily make various changes and modifications according to the present disclosure. Therefore, such changes and modifications are to be understood as included within the scope of the present disclosure.

REFERENCE SIGNS LIST 10, 20, 30 Energy management system
11 Energy management device
12 Smart meter
13 Power conditioner
14 Photovoltaic power generation system
15 Storage battery
16 Distribution board
17 Load apparatus
18 Storage battery device
25 Storage medium
50 Power grid
60 Power company
70 Network
111 Communicator
112 Controller
113 Acquisition unit

The invention claimed is:

1. An energy management device, comprising:
a communicator configured to acquire information regarding a power consumption; and
a controller configured to calculate a targeted range of a future estimated power demand to be notified to a power company based on the information regarding the power consumption,
wherein the controller calculates, for each predetermined time limit, the targeted range based on statistics of the power consumptions acquired over a predetermined number of days, and
wherein the controller is further configured to control charging and discharging of a storage battery, which is under control of the energy management device and supplies power to be consumed, so that the power demand will fall within the targeted range based on comparison of power demand and the targeted range by at least
calculating, for the predetermined time limit, an average value of change rates of the power consumptions in the past from the power consumptions acquired over the predetermined number of days,
calculating, from a power consumption within a predetermined time period immediately after a beginning of the time limit, a current change rate of the power consumption, and,
based on the change rate of the power consumption in the time limit, controlling the storage battery so that the power demand will fall within the targeted range,
wherein the controller controls the storage battery to conduct discharging when the current change rate is greater than the average value of the change rates in the past and when the power demand is anticipated to exceed an upper limit of the targeted range in the time limit, and/or controls the storage battery to conduct charging when the current change rate is less than the average value of the change rates in the past and when the power demand is anticipated to fall below a lower limit of the targeted range in the time limit.

2. The energy management device of claim 1, wherein the predetermined time limit is a reference time length used for determining an electricity price by the power company or a reference time length on a basis of which a basic price, which is set separately from a monthly metered price, is defined by the power company.

3. The energy management device of claim 1, wherein the controller calculates an upper limit of the targeted range by adding, to an average value, a value obtained by multiplying a standard deviation by a predetermined coefficient, and/or calculates a lower limit of the targeted range by subtracting, from an average value, a value obtained by multiplying a standard deviation by a predetermined coefficient.

4. The energy management device of claim 1, wherein the controller switches between discharging and charging in the unit of the predetermined time limit.

5. The energy management device of claim 1, wherein the controller controls the storage battery to stop discharging when, as a result of controlling the storage battery to conduct discharging, the power demand is anticipated to fall below a lower limit of the targeted range.

6. The energy management device of claim 1, wherein the controller controls the storage battery to stop charging when, as a result of controlling the storage battery to conduct charging, the power demand is anticipated to exceed an upper limit of the targeted range.

7. The energy management device of claim 1, wherein, as the information regarding the power consumption, the controller utilizes data used by a demand controller located outside the energy management device.

8. The energy management device of claim 1, wherein the controller is further configured to control a photovoltaic power generation system, which is under control of the energy management device, so that the power demand will fall within the targeted range.

9. The energy management device of claim 8, wherein the controller increases a proportion of power dedicated to self-consumption among power generated by the photovoltaic power generation system when the power consumption is anticipated to exceed an upper limit of the targeted range.

10. The energy management device of claim 1, further comprising:
an acquisition unit configured to acquire characteristic information of the storage battery, wherein based on the characteristic information of the storage battery, the controller calculates a discharging time period required for the storage battery to discharge a minimum unit of amount of power specified by the power company in calculating an electricity price, and when monitoring a reference time length used for determining an electricity price by the power company, the controller determines whether or not to control the storage battery to conduct discharging before a time period calculated by reverse calculation of the discharging time period from an end of the reference time length elapses in the monitored time length.

11. The energy management device of claim 10, wherein the acquisition unit includes a communicator configured to communicate with a storage battery device that is located outside the energy management device and that includes the storage battery.

12. The energy management device of claim 11, wherein the communicator is configured to acquire the characteristic information of the storage battery by way of a power conditioner included in the storage battery device.

13. The energy management device of claim 11, wherein the communicator acquires information regarding a rated output of the storage battery as the characteristic information.

14. The energy management device of claim 10, wherein the reference time length is a reference time length on a basis of which a basic charge, which is set separately from a monthly metered charge, is defined by the power company.

15. The energy management device of claim 10, wherein the minimum unit of amount of power is 1 kWh.

16. An energy management method, comprising:
    acquiring information regarding a power consumption;
    calculating, for each predetermined time limit, a targeted range of a future estimated power demand to be notified to a power company based on statistics of the power consumptions acquired over a predetermined number of days; and
    controlling charging and discharging of a storage battery, which supplies power to be consumed, so that the power demand will fall within the targeted range based on comparison of power demand and the targeted range by at least
        calculating, for the predetermined time limit, an average value of change rates of the power consumptions in the past from the power consumptions acquired over the predetermined number of days,
        calculating, from a power consumption within a predetermined time period immediately after a beginning of the time limit, a current change rate of the power consumption, and,
        based on the change rate of the power consumption in the time limit, controlling the storage battery so that the power demand will fall within the targeted range,
    wherein the controller controls the storage battery to conduct discharging when the current change rate is greater than the average value of the change rates in the past and when the power demand is anticipated to exceed an upper limit of the targeted range in the time limit, and/or controls the storage battery to conduct charging when the current change rate is less than the average value of the change rates in the past and when the power demand is anticipated to fall below a lower limit of the targeted range in the time limit.

17. An energy management system comprising an energy management device and a storage battery, wherein the energy management device includes:
    a communicator configured to acquire information regarding a power consumption; and
    a controller configured to calculate a targeted range of a future estimated power demand to be notified to a power company based on the information regarding the power consumption, and
    wherein the controller:
        calculates, for each predetermined time limit, the targeted range based on statistics of the power consumptions acquired over a predetermined number of days; and
        controls the storage battery, which is under control of the energy management device and supplies power to be consumed, so that the power demand will fall within the targeted range based on comparison of power demand and the targeted range by at least
            calculating, for the predetermined time limit, an average value of change rates of the power consumptions in the past from the power consumptions acquired over the predetermined number of days,
            calculating, from a power consumption within a predetermined time period immediately after a beginning of the time limit, a current change rate of the power consumption, and,
            based on the change rate of the power consumption in the time limit, controlling the storage battery so that the power demand will fall within the targeted range,
        wherein the controller controls the storage battery to conduct discharging when the current change rate is greater than the average value of the change rates in the past and when the power demand is anticipated to exceed an upper limit of the targeted range in the time limit, and/or controls the storage battery to conduct charging when the current change rate is less than the average value of the change rates in the past and when the power demand is anticipated to fall below a lower limit of the targeted range in the time limit.

* * * * *